US008327009B2

(12) United States Patent
Prestenback et al.

(10) Patent No.: US 8,327,009 B2
(45) Date of Patent: Dec. 4, 2012

(54) METHOD AND SYSTEM FOR PROVIDING REAL-TIME STREAMING MEDIA CONTENT

(75) Inventors: Kyle Prestenback, Burbank, CA (US); Jeff Ashbrook, North Hollywood, CA (US); Evan Tahler, Pittsburgh, PA (US); David Jessen, Los Angeles, CA (US); John Scot Pansing, Sherman Oaks, CA (US); Nicholas A. Nero, Monrovia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 283 days.

(21) Appl. No.: 12/655,711

(22) Filed: Jan. 5, 2010

(65) Prior Publication Data
US 2011/0167167 A1 Jul. 7, 2011

(51) Int. Cl.
*G06F 15/16* (2006.01)
(52) U.S. Cl. .......... 709/231; 709/203; 709/232
(58) Field of Classification Search .......... 709/203, 709/231, 232
See application file for complete search history.

(56) References Cited

U.S. PATENT DOCUMENTS

| | | | | |
|---|---|---|---|---|
| 6,618,374 | B1 * | 9/2003 | Buckland et al. | 370/394 |
| 6,879,590 | B2 * | 4/2005 | Pedersen et al. | 370/394 |
| 7,337,248 | B1 * | 2/2008 | Rao et al. | 710/53 |
| 7,426,337 | B2 * | 9/2008 | Yahata et al. | 386/356 |
| 2002/0135608 | A1 * | 9/2002 | Hamada et al. | 345/723 |
| 2006/0156354 | A1 * | 7/2006 | Jung et al. | 725/86 |
| 2010/0161825 | A1 * | 6/2010 | Ronca et al. | 709/231 |
| 2010/0246666 | A1 * | 9/2010 | Miazzo et al. | 375/240.01 |
| 2011/0167167 | A1 * | 7/2011 | Prestenback et al. | 709/231 |

* cited by examiner

*Primary Examiner* — Michael Won
(74) *Attorney, Agent, or Firm* — Farjami & Farjami LLP

(57) ABSTRACT

There is provided a method for execution by a processor of a media playback device to provide media content. The method includes receiving streaming audio data. The streaming audio data comprises a plurality of audio data clips, each audio data clip having a clip size. The method includes providing a circular queue. The circular queue is characterized by a queue size that is at least two or more clip sizes. The circular queue is used to store a plurality of queue clips, each with a clip size. Each of the plurality of audio data clips is stored into one of the plurality of queue clips of the circular queue. After the circular queue has been filled, the method includes sequentially reading and playing the streaming audio data from each one of the plurality of queue clips of the circular queue. Finally, the method includes a step to continue storing a next one of the plurality of audio data clips into a read one of the plurality of queue clips of the circular queue.

16 Claims, 2 Drawing Sheets

METHOD AND SYSTEM FOR PROVIDING REAL-TIME STREAMING MEDIA CONTENT

BACKGROUND OF THE INVENTION

1. Field of the Invention

The present invention relates to providing real-time media to end users and consumers. More specifically, the present invention relates to the streaming of real-time content to a media player.

2. Background Art

Optical media players, including Blu-ray players, have revolutionized the content that homes and businesses can access. Optical media players, including Blu-ray players, have vastly evolved from their compact disc (CD) and digital video disc (DVD) predecessors. CDs, for example, are built to accommodate up to seventy-four minutes of two-track audio data and hold a total capacity of 800 Megabytes (MB). Similarly, DVDs can accommodate 4.7 Gigabytes (GB) of data, which allows a viewer to access two hours and fifteen minutes of standard definition (SD) video encoded in an MPEG-2 format. CD and DVD players, which are generally configured to play their respective discs, have proven insufficient to meet the demands of greater picture and sound quality that drive the information age.

Advances in display technology, including plasma display panels (PDPs) and liquid crystal displays (LCDs) have fueled consumers' appetites for high quality video and audio, including, for instance, high-definition (HD) television. A typical HD broadcast, for example, may require a recording capacity of 22 GB or greater for a two-hour period. Consumers want media players that are interactive and can be integrated with broadband services. Optical media players, including Blu-ray players, meet these needs, often in the context of a small device that can be integrated into a home entertainment system.

However, optical media players, including Blu-ray players, cannot stream audio data due to limitations in their file and application architectures. Existing attempts to provide streaming audio data through optical media players, including Blu-ray players, have therefore consisted of leaving static content on a server. The static content is then downloaded to an optical media player in portions.

Unfortunately, these existing attempts to stream static content into optical media players, including Blu-ray players, have created a patchwork of fixes that provide no coherent way for a listener to stream audio data. Thus, while a user can currently download songs and play video on his or her optical media player, including his or her Blu-ray player, a user cannot listen to high-quality live music or spoken word through such a player.

Accordingly, there is a need to overcome the drawbacks and deficiencies in the art by providing a solution that enables the real-time streaming of audio data, including live music and spoken word, to an optical media player, including a Blu-ray player.

SUMMARY OF THE INVENTION

There are provided methods and systems for providing real-time streaming media content, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
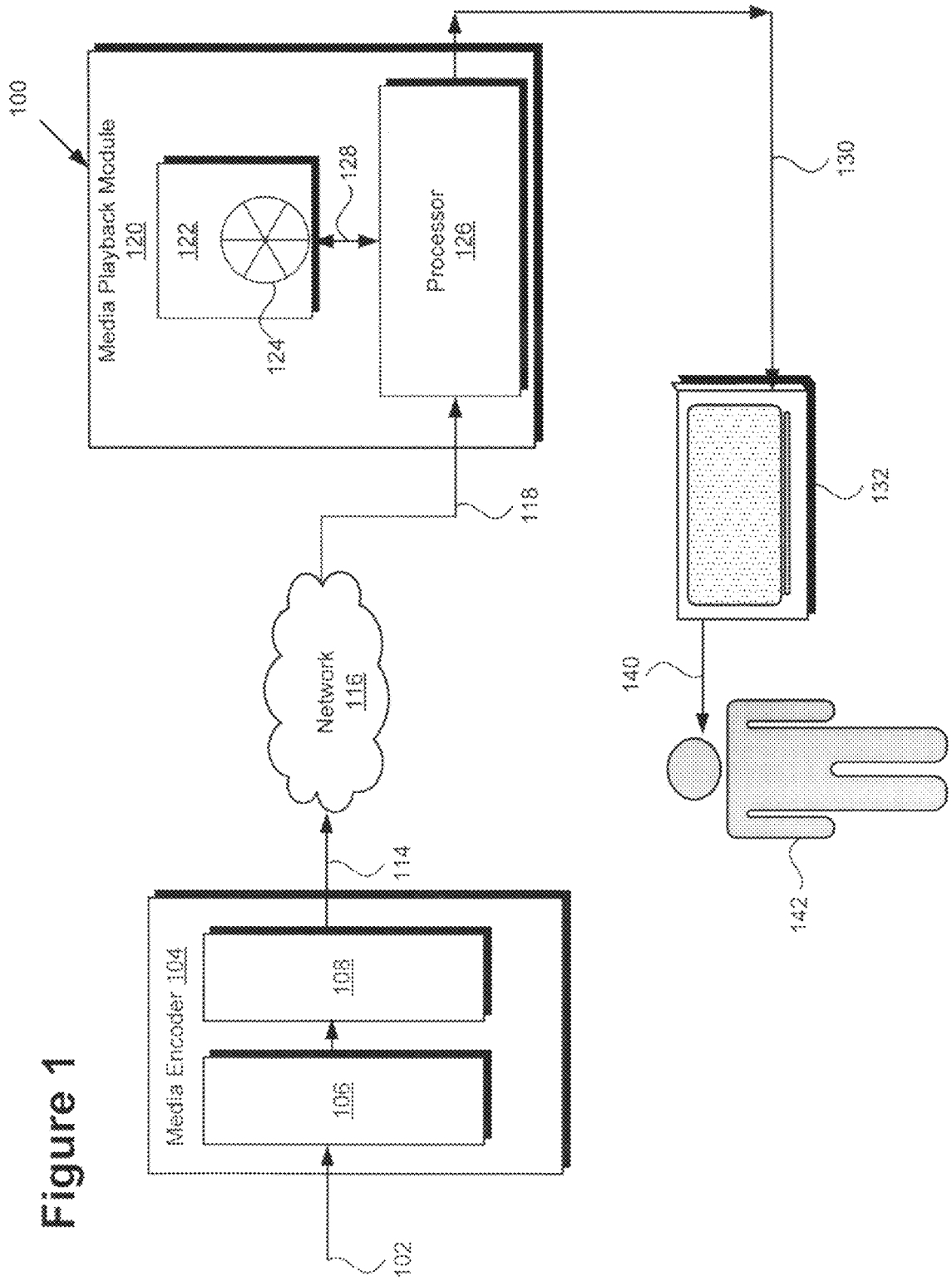
FIG. 1 shows a high-level block diagram of a system incorporating a method or media playback module to provide streaming content to an optical media player, including a Blu-ray player, according to one embodiment of the present invention.

The present application is directed to a media playback method and media playback device to provide real-time streaming audio data to an optical media player, including a Blu-ray player. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

Optical media players, including Blu-ray players, form an important part of the delivery of high quality video and audio. FIG. 1 shows a high-level system diagram of how an embodiment of the present invention fits within user environment 100. FIG. 1 illustrates media encoder 104, which may transport data stream 114 to network 116, which in turn may send input audio data stream 118 into media playback module 120. Media playback module 120 may transmit output data signal 130 to optical media player 132. Optical media player 132 may be configured to output data signal 130 and may send end-user 142 audio and visual signal 140.

The technology underlying optical media player 132 may include a device to read a Blu-ray disc (not pictured). Other features of optical media player 132 may include, for instance, the use of quicker or more efficient modulation methods, better error correction circuitry, the use reliable wobbling address methods, and high speed recording phases.

Optical media player 132 may also include a file system and application environment. The file system of optical disc player 132 may comprise Universal Disc Format (UDF), a file system that can provide the dual functionality of high-speed response to user input and high robustness/reliability necessary for the video and audio demands of a user, for instance end-user 142. The file system of optical media player 132 may also incorporate a Metadata file and a Metadata Mirror file, which taken together, allow optical disc player 132 to form a computer cluster that enhances file system reliability as well as access multiple directories. Other aspects of the UDF file system are addressed in *Universal Disk Format Specification*, Revision 2.60, (Optical Storage Technology Association, Mar. 1, 2005), hereby incorporated by reference in the present application as if set forth fully herein.

The application environment of optical media player 132 may allow for the allocation of audio and video streams through hardware, firmware or software. For instance, applications may be produced using the Blu-ray Disc Java (BD-J) specification, which is used to support the Java Platform, Micro Edition (Java ME) platform on exemplary optical media player 132. Advanced content may be programmed in the form of Xlets, small applications that perform a specific task within the context of the BD-J specification. Programmed content may include, for instance, video or audio content that is played by optical media player 132 and ultimately outputted to end-user 142.

Advanced content may be stored in one of several data structures for managing stream files. See, e.g., *White Paper, Blu-ray Disc Format, Part 2B* (Blu-ray Disc Founders, August, 2004) at 9. Data structures could include layers such as "Index table," "Movie Object/BD-J Object," "Playlist," and "Clip." See, e.g., id. In relevant part, a Blu-ray playlist is a collection of playing intervals (that is, points on a time axis of a clip) put together as a set of clips. See id. at 12. As a collection of playing intervals, a playlist allows a list of songs or other media contents to be played in sequence by the optical media player. Other aspects of the BD-J specification, including playlist features of the specification, are addressed in *White Paper, Blu-ray Disc Format, Parts* 1-3 (Blu-ray Disc Founders, August 2004), hereby incorporated by reference in the present application as if set forth fully herein.

Although embodiments of the present invention can be embedded in optical media player 132, FIG. 1 shows that, according to one embodiment of the present invention, playback module 120 may reside outside optical media player 132. In such an external embodiment, the file and application systems of media playback module 120 may be respectively adapted to conform to the file system and application systems of optical media player 132. For example, media playback module 120 could incorporate the BD-J specification if that specification is used by optical media player 132. Media playback module 120 could also be adapted for input into a Blu-ray player.

In one embodiment, media playback module 120 could comprise processor 126 and memory 122. Media playback module could also comprise other elements, including data buses (not pictured), address buses (not pictured), and input and output devices (not pictured). In one embodiment, media playback module 120 could be configured to receive input audio data stream 118 transported by network 116. Input audio data stream 118 could be processed by processor 126, which could be configured to run a set of processes or instructions. Memory 122 could be used as needed to store data as needed by processor 126. Data stored on memory 122 may include circular file queue 124, which may have a specified queue size. The queue size of circular file queue 124 may comprise the size of two or more clips of input audio data stream 118. Media playback module 120 could further be configured to produce output data signal 130, which may be compatible for use by optical media player 132.

Figure 2:
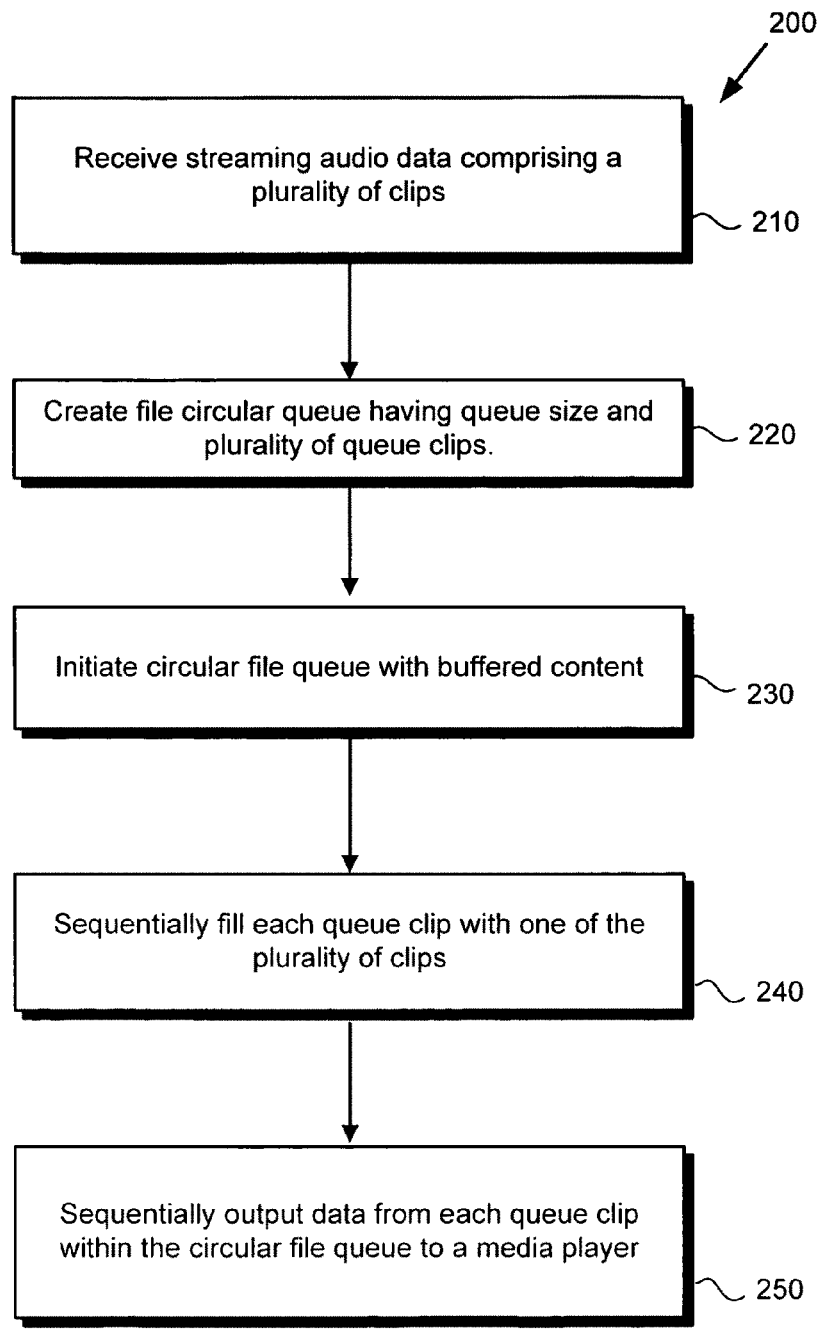
FIG. 2 presents a flowchart of a method for use by a media playback module to provide streaming content to an optical media player, including a Blu-ray player, according to one embodiment of the present invention.

The functionality and advantages attributable to system 100 will now be further described in conjunction with FIG. 2, which presents flowchart 200 describing a method of streaming a real-time audio file to an optical media player, including a Blu-ray player, according to one embodiment of the present invention. The steps shown in flowchart 200 are merely exemplary, however, so that a step may consist of one or more substeps or may involve specialized equipment or materials, as known in the art. While steps 210 through 250 indicated in flowchart 200 are sufficient to describe one embodiment of the present invention, other embodiments may utilize steps different from those shown in flowchart 200, or may include more, or fewer steps.

Turning to step 210 of flowchart 200, step 210 comprises receiving a streaming audio file comprising a plurality of clips. As shown in FIG. 1, media playback module 120 can be configured to receive a streaming audio file comprising a plurality of clips, which may correspond to input audio data stream 118.

As further illustrated in FIG. 1, media playback module 120 could be configured to receive input audio data stream 118 as a packetized network stream. An embodiment of the present invention could accommodate packetized network streams consistent with the file and application formats of optical media player 132. As illustrated in FIG. 1, audio signal 102 (corresponding to, for example, a live broadcast or spoken word) could be input into media encoder 104. Media encoder 104 could include a process executed on a processor or a device (illustrated as audio stream clipper 106) to convert audio signal 102 into a plurality of audio stream clips. In an embodiment, the plurality of audio stream clips could be of equal length. Media encoder 104 could also include a process executed on a processor or a device (illustrated as packet encoder 108) to match predetermined video clips with the audio stream clips. A process executed on a processor or a device such as packet encoder 108 could then place the matched clip (comprising the data from a predetermined video clip and an audio stream clip) into a packetized file that can be streamed over a network (illustrated as network 116).

In an embodiment consistent with FIG. 1, the packetized file may comprise a file in a container file format. The container file could comprise audio and video as well as metadata indicating how audio and video clips are encoded. The container file could further comprise, consistent with the Blu-ray specification, an MPEG Transport Stream or M2TS Stream. In an embodiment of the present invention, clips could comprise audio clips coupled with clips of black video.

Turning to step 220 of flowchart 200, step 220 comprises creating a circular queue of files having a queue size and a plurality of queue clips. As correspondingly shown in FIG. 1, media playback module 120 may be configured to create circular file queue 124. Circular file queue 124 would be characterized by a queue size and a plurality of queue clips. Circular file queue 124 may reside within an internal memory such as memory 122 in FIG. 1. Circular file queue 124 may comprise a data structure that uses a fixed buffer with two or more data elements. The data elements may be queue clips. Initially, write operations may be performed on circular file queue 124 until all queue clips within the circular file queue are full. Once full, subsequent write operations should be performed only on the oldest queue clips within the circular file queue. In one embodiment, clips may be five seconds long and the circular file queue may comprise six queue clips. Such an embodiment provides users a thirty second period to accommodate buffering. Other clip lengths and queue clip numbers are also possible under various embodiments of the present invention.

Turning to step 230 of flowchart 200, step 230 comprises initiating the circular file queue with buffered content. As shown in FIG. 1, this step could be executed by processor 126 and memory 122. In such an embodiment, processor 126 could write buffer content into circular file queue 124 within memory 122.

Turning to step 240 of flowchart 200, step 240 comprises sequentially filling each queue clip within the circular file queue with one of the plurality of clips from the streaming audio file. As shown in FIG. 1, the streaming audio file could comprise, for example, the files corresponding to input audio data stream 118. Consistent with the structure of circular file queue 124 contained in memory 122, step 240 could involve writing data into only the oldest queue clip. Thus, in an embodiment of the present invention, data from input audio data stream 118 is written into the oldest queue clip residing within circular file queue 124. The data is written in a "Round-Robin" format, with the first queue clip within circular file queue 124 filled immediately after the filling of the last queue clip within the circular file queue 124.

Turning to step 250 of flowchart 200, step 250 comprises sequentially outputting data from each queue clip within the circular file queue to a media player. As shown in FIG. 1, media playback device 120 could transmit output data signal 130 corresponding to the contents of a media clip (for example, a clip from input audio data stream 118). Output data signal 130 could be adapted for use by the file or application systems of, for example, optical media player 132. Output data signal 130 may be further adapted for use by a Blu-ray device, and correspond an element of a Blu-ray playlist. Alternatively, output data signal 130 may also correspond to an entire Blu-ray playlist.

Thus, the present application discloses a media playback method and media playback device to provide real-time streaming media to an optical media player, including a Blu-ray player. From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method for execution by a processor of a media playback device to provide media content, the method comprising:
   receiving streaming audio data;
   adapting the streaming audio data for use by a Blu-ray playlist;
   arranging the streaming audio data into a plurality of audio data clips, each of the plurality of audio data clips having a clip size;
   providing a circular queue, the circular queue having a queue size and having a plurality of queue clips, wherein each of the plurality of queue clips has the clip size, wherein the queue size of the circular queue is at least two or more clip sizes;
   storing each of the plurality of audio data clips into each one of the plurality of queue clips of the circular queue;
   after filling the circular queue, sequentially reading and playing the streaming audio data from each one of the plurality of queue clips of the circular queue; and
   continue storing a next one of the plurality of audio data clips into a read one of the plurality of queue clips of the circular queue.

2. The method of claim 1, wherein the audio data clips are of equal length.

3. The method of claim 1, wherein the circular queue comprises six queue clips.

4. The method of claim 1, wherein the streaming audio data is adapted for use by a packetized network stream.

5. The method of claim 1, wherein the streaming audio data comprises at least one container file.

6. The method of claim 5, wherein the at least one container file comprises a M2TS stream.

7. The method of claim 5, wherein the at least one container file further comprises at least one clip of audio and further comprises at least one clip of video.

8. The method of claim 5, wherein the at least one container file further comprises at least one clip of black video.

9. A media playback device to provide media content comprising:
   a memory capable of holding a circular queue, the circular queue having a queue size and having a plurality of queue clips, wherein each of the plurality of queue clips has a clips size;
   a processor configured to:
      receive streaming audio data;
      adapt the streaming audio data for use by a Blu-ray playlist;
      arrange the streaming audio data into a plurality of audio data clips, each of the plurality of audio data clips having a clip size;
      store each of the plurality of audio data clips into each one of the plurality of queue clips of the circular queue;
      after filling the circular queue, sequentially read and play the streaming audio data from each one of the plurality of queue clips of the circular queue; and
      continue storing a next one of audio data clips into a read one of the plurality of queue clips of the circular queue;
      wherein the queue size of the circular queue is at least two or more clip sizes.

10. The media playback device of claim 9, wherein the audio data clips are of equal length.

11. The media playback device of claim 9, wherein the circular queue comprises six queue clips.

12. The media playback device of claim 9, wherein the streaming audio data is adapted for use by a packet network.

13. The media playback device of claim 9, wherein the streaming audio data comprises at least one container file.

14. The media playback device of claim 13, wherein the at least one container file comprises a M2TS stream.

15. The media playback device of claim 13, wherein the at least one container file further comprises at least one clip of audio and further comprises at least one clip of video.

16. The media playback device of claim 13, wherein the at least one container file further comprises at least one clip of black video.

* * * * *